US012427629B2

(12) United States Patent
Hsieh

(10) Patent No.: US 12,427,629 B2
(45) Date of Patent: Sep. 30, 2025

(54) ANTI-VIBRATION WRENCH

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 366 days.

(21) Appl. No.: 18/153,369

(22) Filed: Jan. 12, 2023

(65) Prior Publication Data

US 2023/0226667 A1 Jul. 20, 2023

(30) Foreign Application Priority Data

Jan. 14, 2022 (TW) ................................. 111101751

(51) Int. Cl.
*B25B 13/46* (2006.01)
*B25B 23/16* (2006.01)

(52) U.S. Cl.
CPC ............ *B25B 13/462* (2013.01); *B25B 23/16* (2013.01)

(58) Field of Classification Search
CPC ........ B25B 13/462; B25B 23/19; B25B 19/00
USPC ........................................................ 81/60
See application file for complete search history.

(56) References Cited

U.S. PATENT DOCUMENTS

| | | | | |
|---|---|---|---|---|
| 6,981,435 B2 * | 1/2006 | Hsien | B25B 13/463 | 81/60 |
| 7,044,035 B2 * | 5/2006 | Pregeant | B25B 19/00 | 81/177.2 |
| 8,342,059 B2 * | 1/2013 | Hu | B25B 13/463 | 81/60 |
| 9,156,141 B2 * | 10/2015 | Chang | B25B 13/06 | |
| 11,247,315 B2 * | 2/2022 | MacDonald | B25B 23/0035 | |
| 11,325,229 B2 * | 5/2022 | Zhang | B25B 23/0035 | |
| 11,787,019 B2 * | 10/2023 | Chiang | B25B 23/0035 | 81/58 |
| 2014/0260817 A1 * | 9/2014 | Wilson | B25B 13/5091 | 81/60 |
| 2015/0343615 A1 * | 12/2015 | Merrick | B23B 31/1612 | 81/446 |
| 2022/0024002 A1 * | 1/2022 | Monson | B25B 13/06 | |
| 2025/0073861 A1 * | 3/2025 | Su | B25B 23/0028 | |

* cited by examiner

*Primary Examiner* — Hadi Shakeri
(74) *Attorney, Agent, or Firm* — CKC & Partners Co., LLC

(57) ABSTRACT

An anti-vibration wrench includes a main body, a driving member and an elastic member. The main body includes a driving portion. The driving portion has a through hole and a driving axis. The driving member is sleeved in the through hole of the driving portion, and includes a tooth portion and an outer groove. The tooth portion is disposed around an inner annular surface of the driving member. The outer groove is disposed around an outer annular surface of the driving member. The elastic member is disposed in the outer groove, and located between the driving member and the driving portion. The driving member has a height along a direction parallel to the driving axis, and a disposed position of the outer groove is located between one third to two third of the height.

6 Claims, 6 Drawing Sheets

100

200

ANTI-VIBRATION WRENCH

RELATED APPLICATIONS

This application claims priority to Taiwan Application Serial Number 111101751, filed Jan. 14, 2022, which is herein incorporated by reference.

BACKGROUND

Technical Field

The present disclosure relates to a wrench. More particularly, the present disclosure relates to an anti-vibration wrench.

Description of Related Art

If a machine with precision element is stricken, hit by a force or vibrate due to the impact when a user locks the machine by a hand tool, the precision element in the machine may be damaged. Moreover, when the user locks a machine in an operation state by a hand tool, the vibration generated by the operating machine may conduct to the user's hand, and the operation efficiency of the user may be decreased or the user's hand may be uncomfortable.

Therefore, there is an urgent need for a solution of an anti-vibration wrench which is featured with impact absorbing ability and shock absorbing ability.

SUMMARY

According to one aspect of the present disclosure, an anti-vibration wrench includes a main body, a driving member and an elastic member. The main body includes a driving portion. The driving portion has a through hole and a driving axis. The driving member is sleeved in the through hole of the driving portion, and includes a tooth portion and an outer groove. The tooth portion is disposed around an inner annular surface of the driving member. The outer groove is disposed around an outer annular surface of the driving member. The elastic member is disposed in the outer groove, and located between the driving member and the driving portion. The driving member has a height along a direction parallel to the driving axis, and a disposed position of the outer groove is located between one third to two third of the height.

According to another aspect of the present disclosure, an anti-vibration wrench includes a main body, a driving member and an elastic member. The main body includes a hammering portion and a driving portion. The hammering portion is disposed on an end of the main body, for a hammer to hit, and the hammering portion has an accommodation space. An end of a sleeving rod is detachably sleeved in the accommodation space. The driving portion is disposed on the other end of the main body, and has a through hole and a driving axis. The driving member is sleeved in the through hole of the driving portion, and includes a tooth portion and an outer groove. The tooth portion is disposed around an inner annular surface of the driving member. The outer groove is disposed around an outer annular surface of the driving member. The elastic member is disposed in the outer groove, and located between the driving member and the driving portion. The driving member has a height along a direction parallel to the driving axis, and a disposed position of the outer groove is located between one third to two third of the height.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
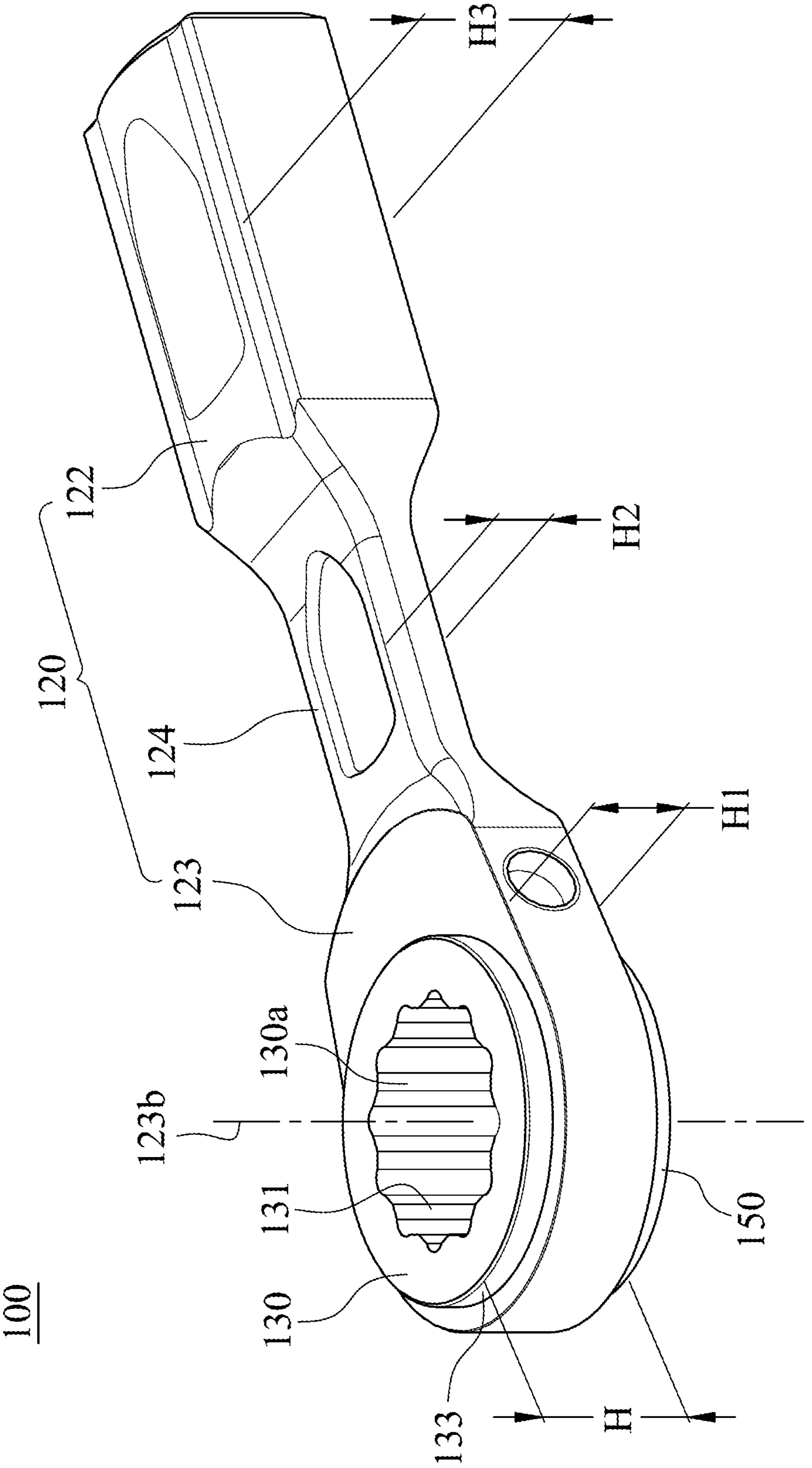
FIG. 1 shows a three-dimensional schematic view of an anti-vibration wrench according to a first embodiment of the present disclosure.
Figure 2:
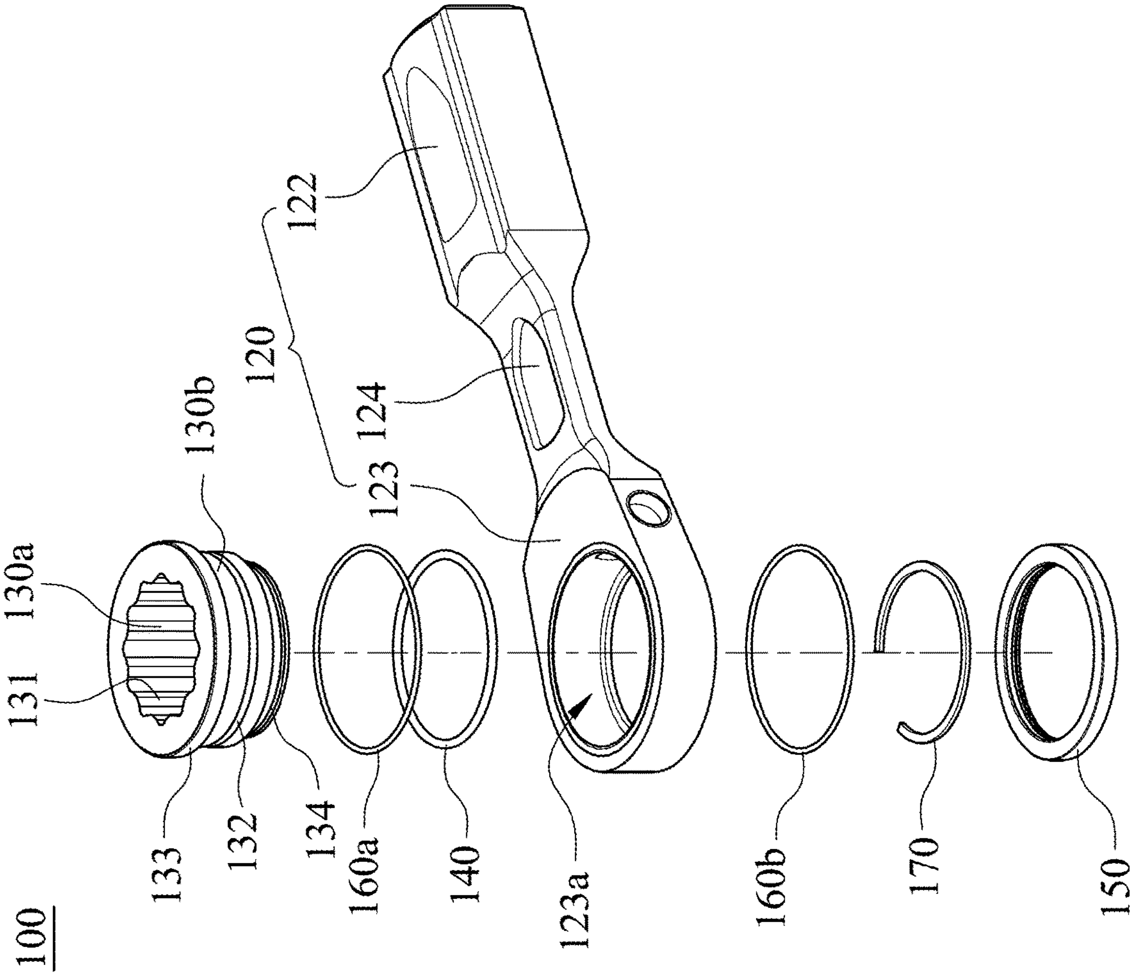
FIG. 2 shows an exploded view of the anti-vibration wrench according to the embodiment in FIG. 1.
Figure 3:
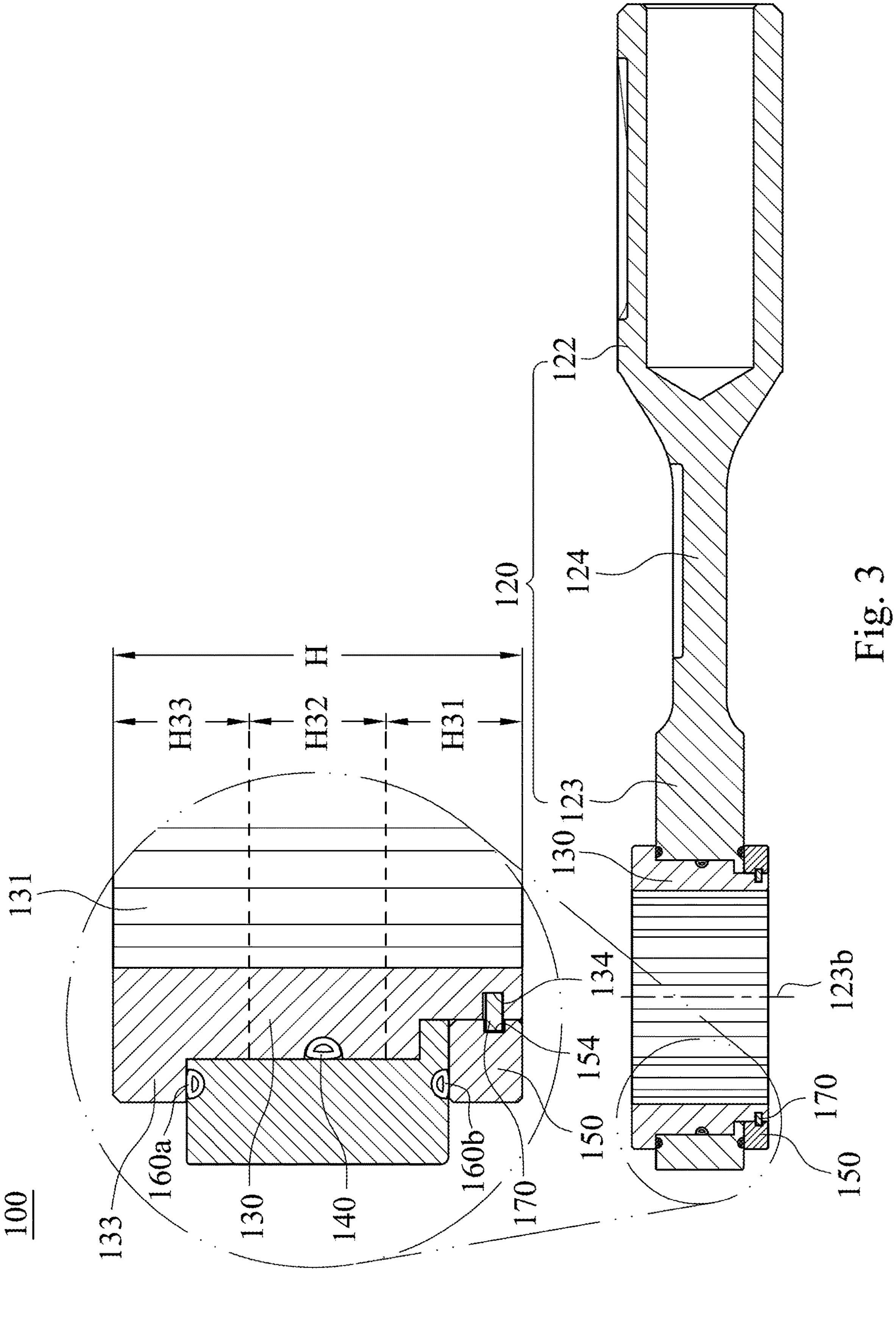
FIG. 3 shows a cross-sectional view of the anti-vibration wrench according to the embodiment in FIG. 1.

Please refer to FIG. 1 to FIG. 3. FIG. 1 shows a three-dimensional schematic view of an anti-vibration wrench 100 according to a first embodiment of the present disclosure. FIG. 2 shows an exploded view of the anti-vibration wrench 100 according to the embodiment in FIG. 1. FIG. 3 shows a cross-sectional view of the anti-vibration wrench 100 according to the embodiment in FIG. 1. The anti-vibration wrench 100 includes a main body 120, a driving member 130 and an elastic member 140. The main body 120 includes a driving portion 123. The driving portion 123 has a through hole **123*a* and a driving axis 123*b*. The driving member 130 is sleeved in the through hole 123*a* of the driving portion 123, and includes a tooth portion 131 and an outer groove 132. The tooth portion 131 is disposed around an inner annular surface 130*a* of the driving member 130. The outer groove 132 is disposed around an outer annular surface 130*b* of the driving member 130. The elastic member 140 is disposed in the outer groove 132, and located between the driving member 130 and the driving portion 123. The driving member 130 has a height H along a direction parallel to the driving axis 123*b*, and a disposed position of the outer groove 132** is located between one third to two third of the height H.

Thus, the anti-vibration wrench 100 of the present disclosure can absorb the vibration conducted from a locking member to the driving member 130 via the elastic member 140, while the anti-vibration wrench 100 is used on the locking member of a machine in an operation state, thereby preventing the user from feeling uncomfortable or cannot apply a force on a hand tool.

In detail, the main body 120 can further include a hammering portion 122 and a connecting portion 124. The hammering portion 122 is disposed on an end of the main body 120, and for a hammer to hit. The connecting portion 124 is connected to the hammering portion 122 and the driving portion 123, and the hammering portion 122 is away from the driving portion 123. A thickness H3 of the hammering portion 122 is greater than a thickness H2 of the connecting portion 124. The hammering portion 122, the connecting portion 124 and the driving portion 123 of the main body 120 are connected in sequence, and formed integrally. The elastic member 140 can be a circlip or other elastic element, but the present disclosure is not limited thereto. The thickness H3 of the hammering portion 122 of the main body 120 is a thickest part of the main body 120, thereby providing a surface with big area for a hammer to hit. The thickness H2 of the connecting portion 124 is less than the thickness H3 of the hammering portion 122 and the thickness H1 of the driving portion 123, thereby reducing the weight of the anti-vibration wrench 100 effectively, and avoiding the excessive weight of the anti-vibration wrench 100 while the thickness H3 of the hammering portion 122 is thickened.

Moreover, the anti-vibration wrench 100 of the present disclosure takes the driving axis 123*b* as an axis to drive the hand tool to rotate. The height H of the driving member 130 can be divided into three parts H31, H32 and H33 from an end to the other end of the driving member 130. A disposed position of the outer groove 132 is located in the part H32. In FIG. 3, the disposed position of the outer groove 132 is located at half of the height H, but the present disclosure is not limited thereto.

By disposing the elastic member 140 in a middle section (the part H32 of the height H) of the driving member 130, and completely surrounded the outer annular surface 130*b* of the driving member 130 by the elastic member 140, the elastic member 140 of the anti-vibration wrench 100 of the present disclosure can act as a buffer to absorb a vibration generated while the main body 120 is hit by an external force and an impact force conducted from various directions of the main body 120 to the driving member 130, thereby avoiding the precision elements locked on the machine be damaged by the vibration generated from the impact force.

The driving member 130 can further include a protruding portion 133. The protruding portion 133 is located on the end of the driving member 130, and protrudes toward the main body 120 from the driving axis 123*b*. The protruding portion 133 is configured to position the driving member 130 in the through hole 123*a*. The anti-vibration wrench 100 can further include a fastening member 150. The fastening member 150 is fastened on the other end of the driving member 130 which is away from the protruding portion 133.

In other words, the driving member 130 can be an annular cylinder. The protruding portion 133 protrudes from the end of the driving member 130, and an outer diameter of the protruding portion 133 is greater than a diameter of the through hole 123*a* of the driving portion 123, thereby positioning the driving member 130 in the through hole 123*a*. An inner diameter of the fastening member 150 matches with the other end of the driving member 130 which is away from the protruding portion 133. The outer diameter of the fastening member 150 is greater than an inner diameter of the through hole 123*a* of the driving portion 123, thereby fixing the driving member 130 in the main body 120. Thus, the anti-vibration wrench 100 of the present disclosure can assemble the driving member 130 into the main body 120 via the fastening member 150 so as to reduce the vibration.

The anti-vibration wrench 100 can further include two gaskets 160*a*, 160*b* and a dust-proof gasket 170. The two gaskets 160*a*, 160*b* surround on the outer annular surface 130*b* of the driving member 130. One of the gaskets (the gasket 160*a*) is disposed between the driving member 130 and the driving portion 123, and the other of the gaskets (the gasket 160*b*) is disposed between the driving portion 123 and the fastening member 150. The dust-proof gasket 170 is disposed between the fastening member 150 and the driving member 130. In detail, the driving member 130 further includes a first groove 134. The fastening member 150 includes a second groove 154. The first groove 134 and the second groove 154 form an annular space (not labelled in figures), and the dust-proof gasket 170 is disposed in the annular space.

Moreover, each of the two gaskets 160*a*, 160*b* can be an O-shape gasket or an O-ring, the dust-proof gasket 170 can be an O-shape gasket or a C-shape gasket, but the present disclosure is not limited thereto. The driving member 130 and the fastening member 150 are tightly assembled on the main body 120 via the gaskets 160*a*, 160*b* to prevent swaying due to a gap formed between the driving member 130 and the main body 120 and another gap formed between the fastening member 150 and the main body 120.

Figure 4:
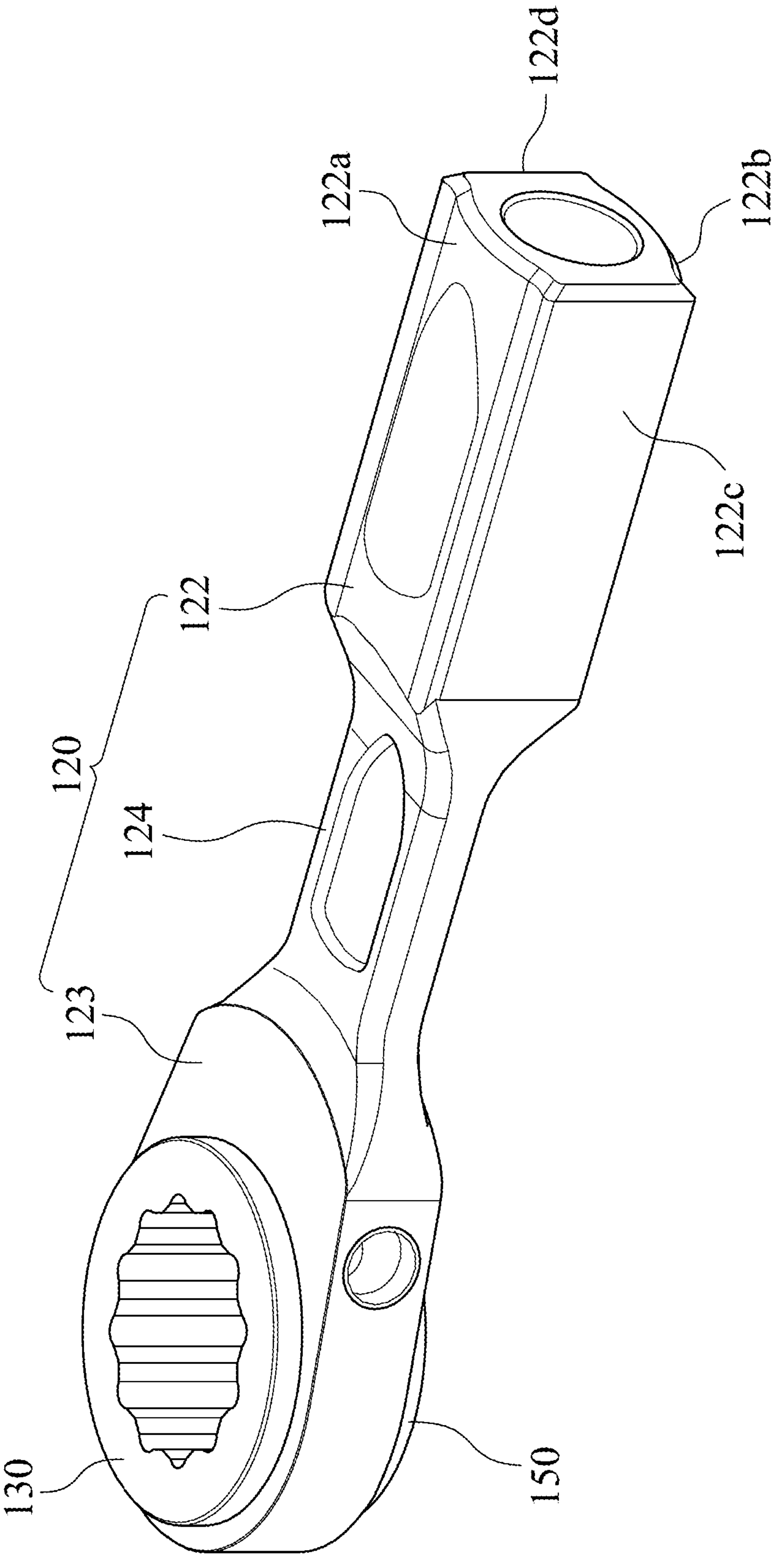
FIG. 4 shows another three-dimensional schematic view of the anti-vibration wrench according to the embodiment in FIG. 1.

Please refer to FIG. 4. FIG. 4 shows another three-dimensional schematic view of the anti-vibration wrench 100 according to the embodiment in FIG. 1. In FIG. 4, the hammering portion 122 can include two arc surfaces 122*a*, 122*b* and two flat surfaces 122*c*, 122*d*. The two arc surfaces 122*a*, 122*b* are disposed opposite to each other. The two flat surfaces 122*c*, 122*d* are disposed opposite to each other, the flat surfaces 122*c* is connected to the two arc surfaces 122*a*, 122*b*, and the flat surfaces 122*d* is connected to the two arc surfaces 122*a*, 122*b*. In detail, when the user locks or releases the locking member by the anti-vibration wrench 100, the user can use a hammer to hit one of the two flat surfaces 122*c*, 122*d* to apply a force on the anti-vibration wrench 100 easily. Moreover, each of the arc surfaces 122*a*, 122*b* are configured in an arc shape for the user to recognize the hitting position, which can prevent the user from hitting on the wrong position, and disable to lock or release the locking member.

Figure 5:
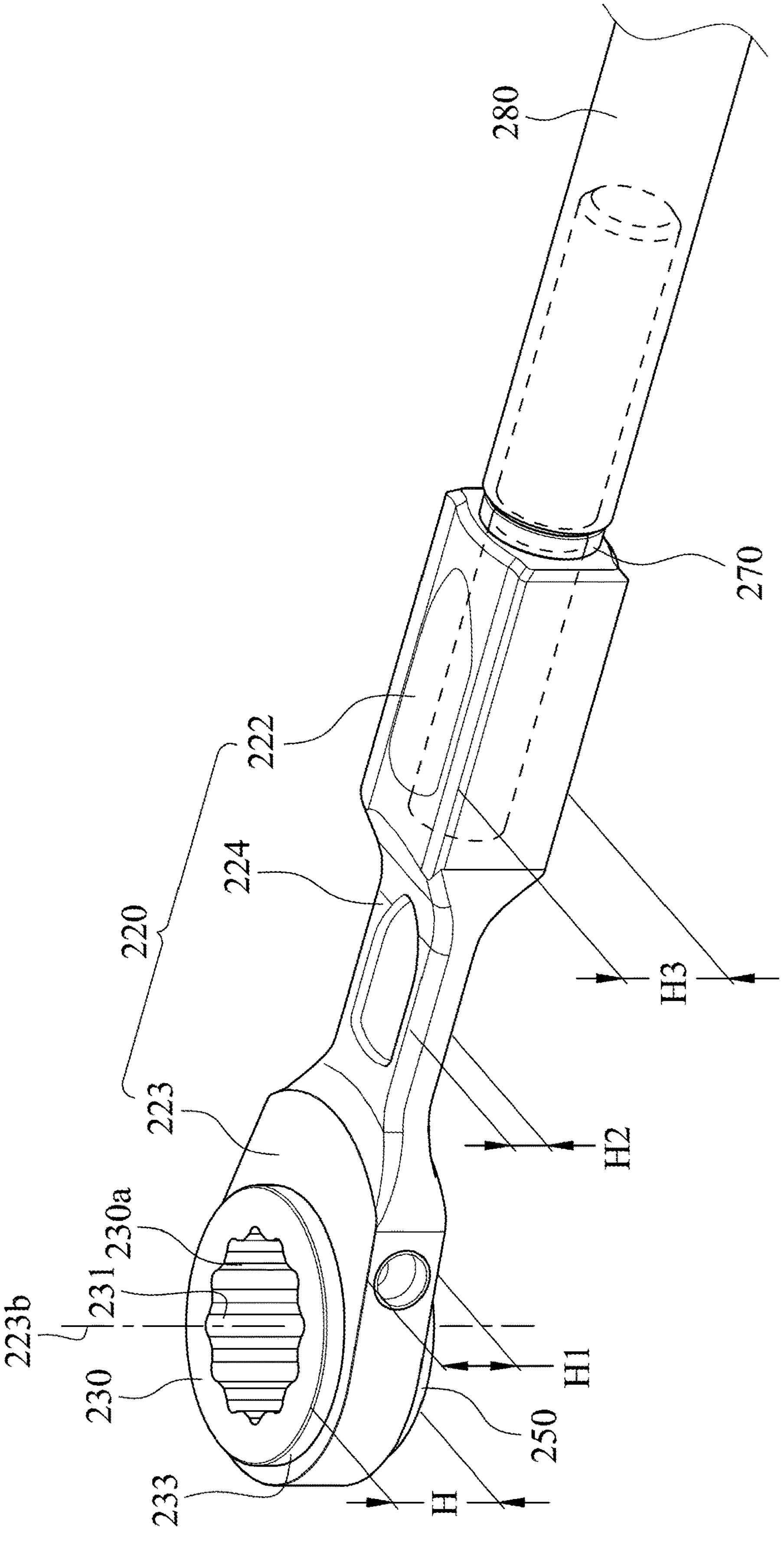
FIG. 5 shows a three-dimensional schematic view of an anti-vibration wrench according to a second embodiment of the present disclosure.
Figure 6:
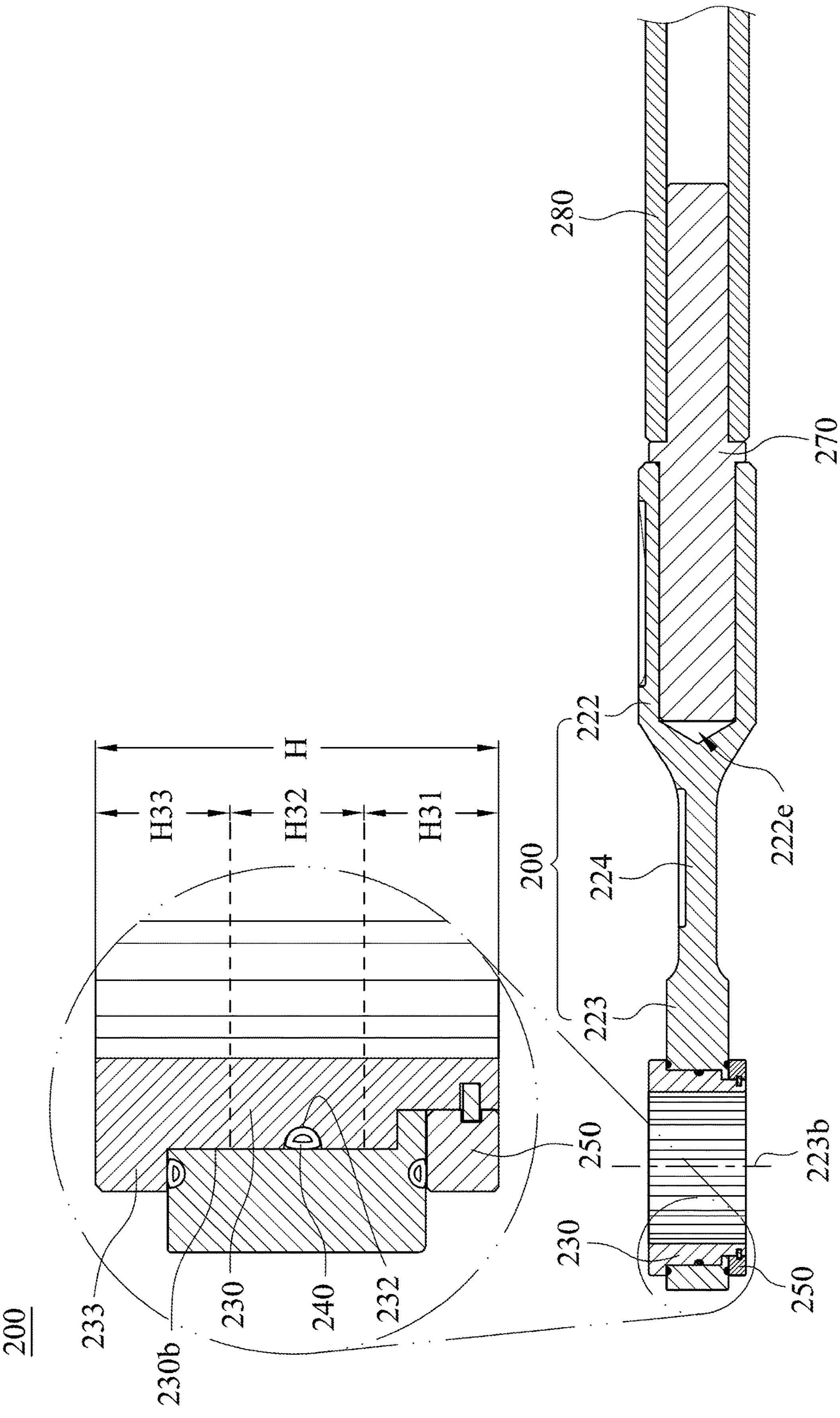
FIG. 6 shows a cross-sectional view of the anti-vibration wrench according to the embodiment in FIG. 5.

Please refer to FIG. 5 and FIG. 6. FIG. 5 shows a three-dimensional schematic view of an anti-vibration wrench 200 according to a second embodiment of the present disclosure. FIG. 6 shows a cross-sectional view of the anti-vibration wrench 200 according to the embodiment in FIG. 5. The anti-vibration wrench 200 includes a main body 220, a driving member 230 and an elastic member 240. The main body 220 includes a hammering portion 222, a driving portion 223 and a connecting portion 224. The hammering portion 222 is disposed on an end of the main body 220, and for a hammer to hit. The hammering portion 222 has an accommodation space 222*e*. An end of a sleeving rod 270 is detachably sleeved in the accommodation space 222*e*. The driving portion 223 is disposed on the other end of the main body 220, and has a through hole (not labeled in figures) and a driving axis 223*b*. The connecting portion 224 is connected to the hammering portion 222 and the driving portion 223. A thickness H3 of the hammering portion 222 is greater than a thickness H2 of the connecting portion 224. The driving member 230 is sleeved in the through hole of the driving portion 223, and includes a tooth portion 231 and an outer groove 232. The tooth portion 231 is disposed around an inner annular surface 230*a* of the driving member 230. The outer groove 232 is disposed around an outer annular surface 230*b* of the driving member 230. The elastic member 240 is disposed in the outer groove 232, and located between the driving member 230 and the driving portion 223. The driving member 230 has a height H along a direction parallel to the driving axis 223*b*, and a disposed position of the outer groove 232 is located between one third to two third of the height H.

In detail, the driving member 230 can further include a protruding portion 233. The protruding portion 233 is located on an end of the driving member 230, and protrudes toward the main body 220 from the driving axis 223*b*. The protruding portion 233 is configured to position the driving member 230 in the through hole. The anti-vibration wrench 200 can further include a fastening member 250. The fastening member 250 is fastened on the other end of the driving member 230 which is away from the protruding portion 233.

In the embodiment of FIG. 5, the structure of the driving member 230, the elastic member 240, the fastening member 250, the driving portion 223, the connecting portion 224, the tooth portion 231, the outer groove 232 and the protruding portion 233 are the same as the structure of the driving member 130, the elastic member 140, the fastening member 150, the driving portion 123, the connecting portion 124, the tooth portion 131, the outer groove 132 and the protruding portion 133 in the first embodiment, respectively, and will not be described again herein. Further, the anti-vibration wrench 200 can further include a connecting tube 280. The connecting tube 280 is sleeved on the other end of the sleeving rod 270, for the user to hold and operate easily.

The anti-vibration wrench 200 of the present disclosure not only can absorb a vibration generated while the main body 220 is hit by an external impact force via the elastic member 240, but also reduce the vibration conducted from various directions of the main body 220, thereby avoiding the precision elements locked on the machine be damaged by the vibration generated from the external impact force. Furthermore, the anti-vibration wrench 200 of the present disclosure can be applied in various environments by sleeving with connecting tubes 280 with different length.

According to the aforementioned embodiments and examples, the advantages of the present disclosure are described as follows.

1. The anti-vibration wrench of the present disclosure can absorb the vibration conducted from a locking member to the driving member via the elastic member, while the anti-vibration wrench is used on the locking member of a machine in an operation state, thereby preventing the user from feeling uncomfortable or cannot apply a force on a hand tool.

2. By disposing the elastic member in a middle section of the driving member, and completely surrounding the outer annular surface of the driving member by the elastic member, the anti-vibration wrench of the present disclosure can absorb a vibration generated while the main body is hit by an external force and an impact force conducted from various directions of the main body to the driving member, thereby avoiding the precision elements locked on the machine be damaged by the vibration generated from the impact force.

3. The anti-vibration wrench of the present disclosure can assemble the driving member into the main body via the fastening member so as to reduce the vibration.

4. The anti-vibration wrench not only can absorb a vibration generated while the main body is hit by an external impact force via the elastic member, but also reduce the vibration conducted from various directions of the main body, thereby avoiding the precision elements locked on the machine be damaged by the vibration generated from the external impact force. Furthermore, the anti-vibration wrench of the present disclosure can be applied in various environments by sleeving with connecting tubes with different length.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An anti-vibration wrench, comprising:

a main body, comprising:

a driving portion having a through hole and a driving axis;

a driving member sleeved in the through hole of the driving portion, and comprising:

a tooth portion disposed around an inner annular surface of the driving member; and an outer groove disposed around an outer annular surface of the driving member; and an elastic member disposed in the outer groove, and located between the driving member and the driving portion;

wherein the driving member has a height along a direction parallel to the driving axis, and a disposed position of the outer groove is located between one third to two third of the height;

wherein the driving member further comprises:

a protruding portion located on an end of the driving member and protruding toward the main body from the driving axis, wherein the protruding portion is configured to position the driving member in the through hole; and an indent portion located on the other end of the driving member, and indent toward the driving axis from the main body, wherein the indent portion is engaged with the driving member;

a fastening member fastening on the other end of the driving member which is away from the protruding portion;

two gaskets surrounding on the outer annular surface of the driving member, one of the gaskets disposed between the protruding portion of the driving member and the driving portion, and the other of the gaskets disposed between the driving portion and the fastening member; and a dust-proof gasket disposed between the fastening member and the indent portion of the driving member;

wherein the driving member further comprises a first groove, the fastening member comprises a second groove, the first groove and the second groove form an annular space, and the dust-proof gasket is disposed in the annular space.

2. The anti-vibration wrench of claim 1, wherein the main body further comprises:

a hammering portion away from the driving portion, and for a hammer to hit; and a connecting portion connected to the hammering portion and the driving portion, wherein a thickness of the hammering portion is greater than a thickness of the connecting portion.

3. The anti-vibration wrench of claim 2, wherein the hammering portion comprises:

two arc surfaces disposed opposite to each other; and two flat surfaces disposed opposite to each other, and each of the flat surfaces is connected to the two arc surfaces.

4. An anti-vibration wrench, comprising:

a main body, comprising:

a hammering portion disposed on an end of the main body, and for a hammer to hit, the hammering portion having an accommodation space, wherein an end of a sleeving rod is detachably sleeved in the accommodation space; and a driving portion disposed on the other end of the main body, and having a through hole and a driving axis;

a driving member sleeved in the through hole of the driving portion, and comprising:

a tooth portion disposed around an inner annular surface of the driving member; and an outer groove disposed around an outer annular surface of the driving member; and an elastic member disposed in the outer groove, and located between the driving member and the driving portion;

wherein the driving member has a height along a direction parallel to the driving axis, and a disposed position of the outer groove is located between one third to two third of the height;

wherein the driving member further comprises:

a protruding portion located on an end of the driving member, and protruding toward the main body from the driving axis, wherein the protruding portion is configured to position the driving member in the through hole; and an indent portion located on the other end of the driving member, and indent toward the driving axis from the main body, wherein the indent portion is engaged with the driving member;

wherein the anti-vibration wrench further comprising:

a fastening member fastening on the other end of the driving member which is away from the protruding portion;

two gaskets surrounding on the outer annular surface of the driving member, one of the gaskets disposed between the protruding portion of the driving member and the driving portion, and the other of the gaskets disposed between the driving portion and the fastening member; and a dust-proof gasket disposed between the fastening member and the indent portion of the driving member;

wherein the driving member further comprises a first groove, the fastening member comprises a second groove, the first groove and the second groove form an annular space, and the dust-proof gasket is disposed in the annular space.

5. The anti-vibration wrench of claim 4, wherein the main body further comprises:

a connecting portion connected to the hammering portion and the driving portion, wherein a thickness of the hammering portion is greater than a thickness of the connecting portion.

6. The anti-vibration wrench of claim 4, further comprising:

a connecting tube sleeved on the other end of the sleeving rod.

* * * * *